(12) United States Patent
Salter et al.

(10) Patent No.: US 9,586,518 B2
(45) Date of Patent: Mar. 7, 2017

(54) LUMINESCENT GRILLE BAR ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/519,845

(22) Filed: Oct. 21, 2014

(65) Prior Publication Data

US 2015/0138807 A1 May 21, 2015

Related U.S. Application Data

(63) Continuation-in-part of application No. 14/086,442, filed on Nov. 21, 2013.

(51) Int. Cl.
*B60Q 1/26* (2006.01)
*F21S 8/10* (2006.01)
*B60R 19/52* (2006.01)

(52) U.S. Cl.
CPC .......... *B60Q 1/2661* (2013.01); *F21S 48/214* (2013.01); *F21S 48/2212* (2013.01); *B60Q 2400/20* (2013.01); *B60R 2019/525* (2013.01)

(58) Field of Classification Search
CPC .............. B60Q 1/2661; B60Q 2400/20; B60R 2400/20; B60R 2019/525; F21S 48/214; F21S 48/2212
See application file for complete search history.

(56) References Cited

U.S. PATENT DOCUMENTS

| | | | |
|---|---|---|---|
| 5,709,453 | A | 1/1998 | Krent et al. |
| 6,031,511 | A | 2/2000 | DeLuca et al. |
| 6,117,362 | A | 9/2000 | Yen et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,986,597 | B2 * | 1/2006 | Elwell .................. B60Q 1/2661 362/496 |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Stephen F Husar
(74) *Attorney, Agent, or Firm* — Jason Rogers; Price Heneveld LLP

(57) ABSTRACT

A vehicle grille assembly is provided herein. The grille assembly includes a plurality of grille bars, each including a housing having a first portion and a second portion. The first portion of each grille bar illuminates in a first color and the second portion of at least one grille bar illuminates in a second color that is visually distinct from the first color.

19 Claims, 3 Drawing Sheets

(56) References Cited

U.S. PATENT DOCUMENTS

| | | |
|---|---|---|
| 6,990,922 B2 | 1/2006 | Ichikawa et al. |
| 7,161,472 B2 | 1/2007 | Strumolo et al. |
| 7,195,385 B2 | 3/2007 | Zimmermann et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0236870 A1* | 10/2005 | Lin .............. B60Q 1/2661 296/193.1 |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0072556 A1 | 3/2009 | Kudelko et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102007018678 A1 | 10/2008 |
| EP | 1793261 A1 | 6/2007 |
| EP | 2778209 A1 | 9/2014 |
| JP | 2000159011 A | 6/2000 |
| JP | 2007238063 A | 9/2007 |
| JP | 2012113970 A | 6/2012 |
| WO | 2006047306 A1 | 5/2006 |
| WO | 2014068440 A1 | 5/2014 |

\* cited by examiner

US 9,586,518 B2

LUMINESCENT GRILLE BAR ASSEMBLY

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a grille bar of a vehicle grille assembly is provided. The grille bar includes a housing and a first and a second light source disposed inside the housing. A first portion of the housing is configured to luminesce in response to excitation by light emitted from the first light source. A second portion of the housing is configured to transmit light emitted from the second light source.

According to another aspect of the present invention, a vehicle grille assembly is provided. The grille assembly includes a plurality of grille bars, each including a housing having a first portion and a second portion. The first portion of each grille bar illuminates in a first color and the second portion of at least one grille bar illuminates in a second color that is visually distinct from the first color.

According to another aspect of the present invention, a grille bar of a vehicle grille assembly is provided. The grille bar includes a housing having a first portion and a second portion. A first light source is disposed inside the housing and is configured to illuminate the first portion. The first portion is configured to luminesce upon receiving light emitted from the first light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a luminescent grille bar assembly that advantageously employs one or more photoluminescent structures configured to convert light received from an associated light source and re-emit the light at a different wavelength.

Figure 1A:
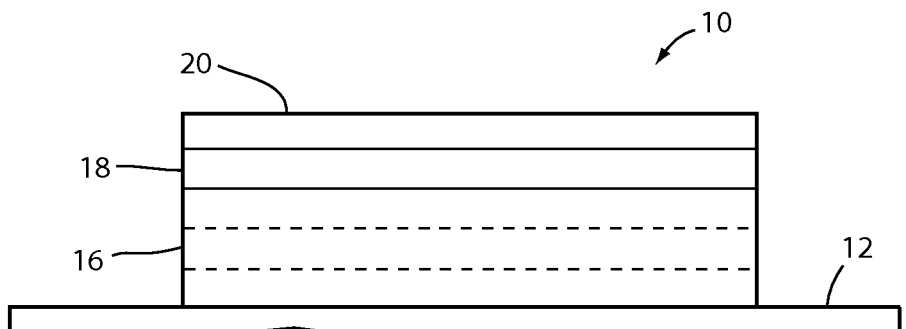
FIG. 1A illustrates a photoluminescent structure coupled to a support member, according to one embodiment.
Figure 1B:
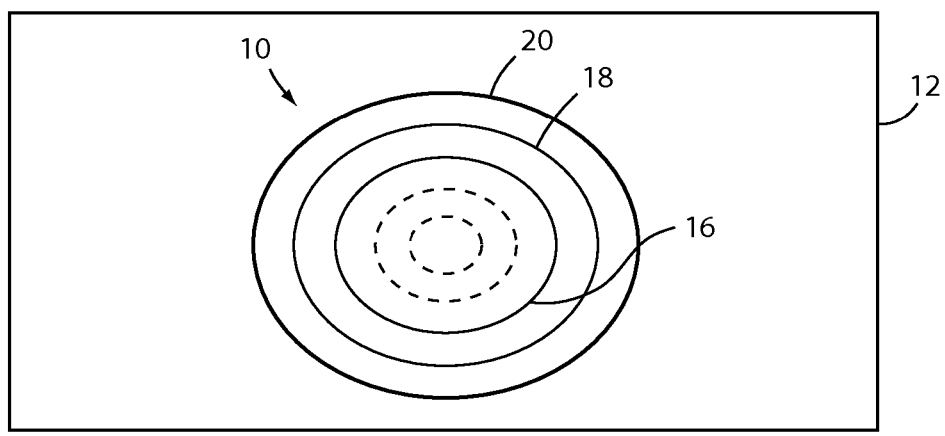
FIG. 1B illustrates a photoluminescent structure coupled to a support member, according to another embodiment.
Figure 1C:
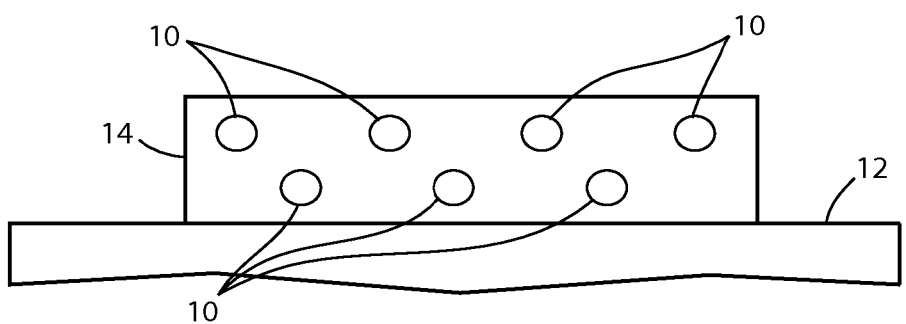
FIG. 1C illustrates a photoluminescent structure coupled to a support member, according to yet another embodiment.

Referring to FIGS. 1A-1C, various exemplary embodiments of a photoluminescent structure 10 are shown, each capable of being coupled to a support member 12, which may correspond to a vehicle fixture or vehicle related piece of equipment. In FIG. 1A, the photoluminescent structure 10 is generally shown rendered as a coating (e.g. a film) that may be applied to a surface of the support member 12. In FIG. 1B, the photoluminescent structure 10 is generally shown as a discrete particle capable of being integrated with a support member 12. In FIG. 1C, the photoluminescent structure 10 is generally shown as a plurality of discrete particles that may be incorporated into a support medium 14 (e.g. a film) that may then be applied (as shown) or integrated with the support member 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photo luminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired support member. The energy conversion layer 16 may be applied to a support member by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a support member using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
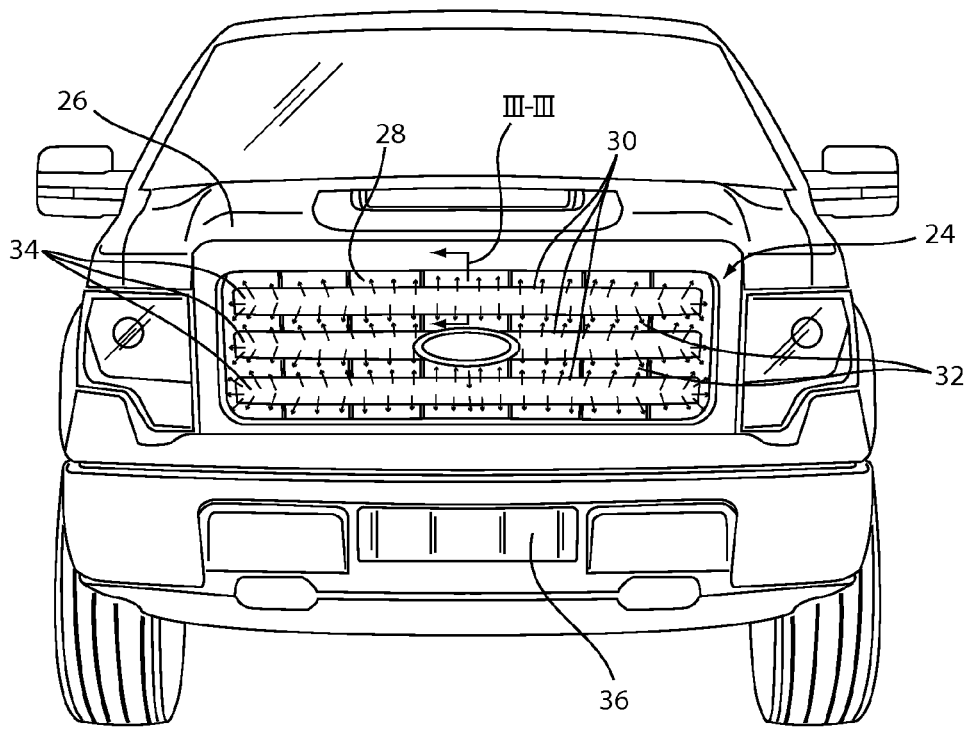
FIG. 2 is a front view of a vehicle having a luminescent grille bar assembly.

Referring to FIG. 2, a vehicle 22 is shown having a grille assembly 24 located in a front fascia 26 of the vehicle 22. The grille assembly 24 generally covers an opening 28 in the front fascia 26 to allow cooling air to enter the engine compartment while also protecting various parts therein such as the engine and the radiator. The grille assembly 24 may also function as a styling element that is used to enhance the appearance of the vehicle 22. The grille assembly 24 may include a plurality of grille bars 30 having a linear and/or non-linear configuration. The grille bars 30 may be elongated and may extend horizontally from one side of the vehicle 22 to the other. In other embodiments, the grille bars 30 may take on vertical or crosshatched arrangements. The grille bars 30 may be arranged in a stacked configuration in which a space 32 is created between each grille bar 30 to allow air to enter the opening 28. As will be described below in greater detail, each of the grille bars 30 may be configured to provide one or more distinct lighting functions. For instance, each grille bar 30 may have a front portion 34 that illuminates in a first color and a rear portion (not shown) that illuminates in a second color that is visually distinct from the first color. When the vehicle 22 is viewed head on, the front portion 34 of each grille bar 30 provides an outward glow while the rear portion of each grille bar 30 illuminates the area behind the grille assembly 24. The rearward illumination may be viewed through the spaces 32 between each grille bar 30 and may be further visible through vents 36 or other openings on the front fascia 26 of the vehicle 22. The contrast in lighting between the front portions 34 and the rear portions of the grille bars 30 imparts a distinct styling element to the grille assembly 24. While a grille assembly 24 for use in the front fascia 26 has been described herein, it should be understood that grille assemblies in other vehicle locations may be similarly configured.

Figure 3:
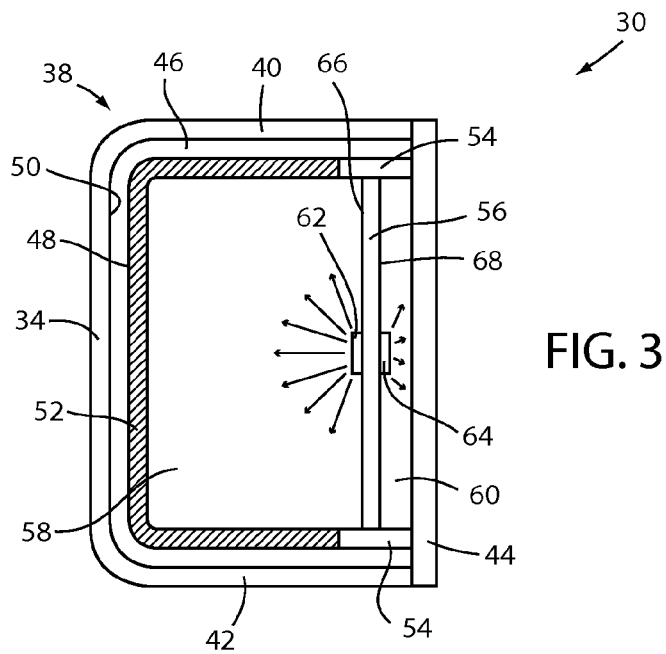
FIG. 3 is a cross-sectional view of a grille bar taken along lines III-III of FIG. 2.

Referring to FIG. 3, a cross-section of a grille bar 30 is shown according to one embodiment. The grille bar 30 includes a housing 38 having a front portion 34, a top portion 40, a bottom portion 42, and a rear portion 44. Each portion 34, 40, 42, 44 may be constructed from a rigid material that is substantially light permeable, such as, but not limited to, plastic. The front, top, and bottom portions 34, 40, 42 may be embodied in a one-piece U-shaped configuration that is assembled to the rear portion 44 via sonic or laser welding.

Alternatively, the portions 34, 40, 42, 44 of the housing 38 may be assembled together via low-pressure insert molding.

Portions of the housing 38 that are readily visible may be metalized to give the grille bar 30 a metallic appearance. In one embodiment, a metallic layer 46 may be applied to the underside of the front, top, and bottom portions 34, 40, 42 via partial vacuum deposition. The metallic layer 46 should be light permeable to allow light to pass therethrough from an inner side 48 to an outer side 50.

The grille bar 30 may also include a photoluminescent structure 52 coupled to the front portion 34, and optionally, some or all of the top and/or bottom portions 40, 42 of the housing 38. According to one embodiment, the photoluminescent structure 52 at least partially covers the metallic layer 46 and may be applied over the metallic layer 46 as a single continuous structure or multiple structures. The remaining uncovered portions of the metallic layer 46 may be covered by a light reflecting layer 54 that includes, but is not limited to, white paint. In an alternative embodiment, the photoluminescent structure 52 may be molded or otherwise integrated into the front, top, and/or bottom portions 34, 40, 42.

Referring still to FIG. 3, the grille bar 30 may further include a printed circuit board (PCB) 56 that is disposed inside the housing 38 and may extend the length of the grille bar 30. The PCB 56 may be secured to the top and bottom portions 40, 42 of the housing 38 and may be vertically aligned with the front and rear portions 34, 44 of the housing 38. Additionally, the PCB 56 may be dimensioned to partition the housing 38 into a first compartment 58 and a second compartment 60. At least one light source 62 may be located in the first compartment 58 and at least one light source 64 may be located in the second compartment 60. Both light sources 62, 64 may be powered by a vehicle power supply or other power supply. Light source 62 may be disposed on a first side 66 of the PCB 56 and light source 64 may be disposed on a second side 68 of the PCB 56. A white solder mask (not shown) may be applied to the first and second sides 66, 68 of the PCB 56 to reflect light incident thereon.

Figure 4:
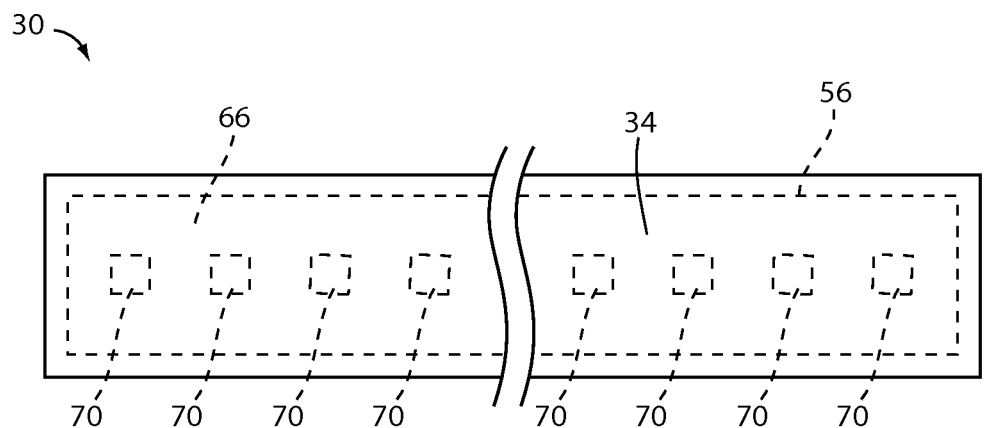
FIG. 4 is front view of a grille bar having a plurality of light emitting diodes disposed therein.
Figure 5:
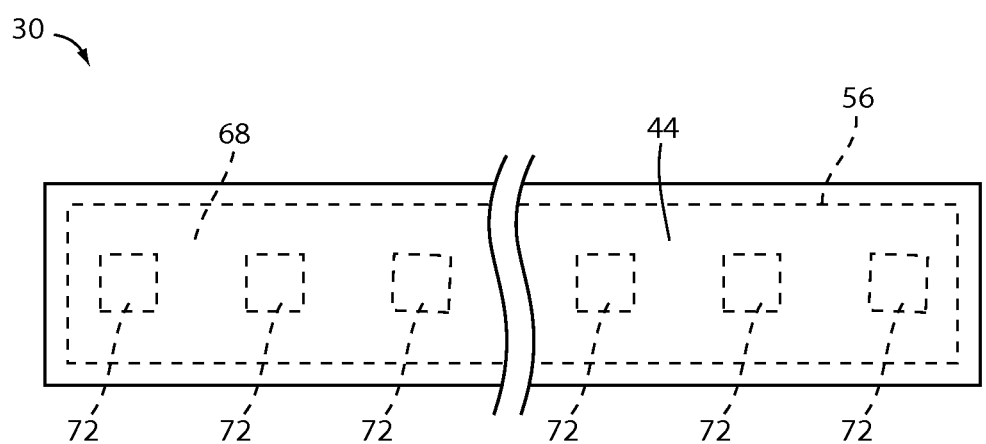
FIG. 5 is a rear view of a grille bar having a plurality of light emitting diodes disposed therein.

Light source 62 may be configured to emit non-focused light that excites a substantial portion of the photoluminescent structure 52 whereas light source 64 may be configured to emit non-focused light that substantially illuminates the rear portion 44 of the housing 38 and is transmitted therethrough to provide lighting to the surrounding area. Light sources 62 and 64 may be configured as various light types, such as, but not limited to, halogen lights, fluorescent lights, light emitting diodes (LEDs), organic LEDs (OLEDs), and polymer LEDs (PLEDs). In one embodiment, a plurality of LEDs 70 may be spaced longitudinally across the first side 66 of the PCB 56 and oriented to face the front portion 34 of grille bar 30 (FIG. 4). Additionally, a plurality of LEDs 72 may be spaced longitudinally across the second side 68 of the PCB 56 and oriented to face the rear portion 44 of the grille bar 30 (FIG. 5). The respective LEDs 70, 72 may be connected in series or in parallel and are not limited to any particular number. However, by positioning the PCB 56 further away from the front portion 34, or said differently, closer toward the rear portion 44, fewer LEDs 70 may be required to evenly illuminate the photoluminescent structure 52, thereby reducing build cost. As a further cost saving measure, it may not be necessary to include LEDs 72 in each grille bar 30 of a grille assembly 24 in order to generate sufficient rearward illumination. For example, with respect to the grille assembly 24 shown in FIG. 2, it may be possible to sufficiently illuminate the area behind the grille assembly 24 by only providing LEDs 72 in the middle grille bar 30.

In operation, portions of the housing 38 that are covered by the photoluminescent structure 52 may be configured to luminesce in response to excitation by light emitted from light source 62. Specifically, the photoluminescent structure 52 may be configured to perform an energy conversion on light emitted from light source 62. According to one embodiment, the photoluminescent structure 52 is configured to down convert light received from light source 62 to a new light of a longer wavelength. Light source 62 may be an LED configured to emit ultraviolet light (~10-400 nanometers in wavelength), violet light (~380-450 nanometers in wavelength), or blue light (~450-495 nanometers in wavelength) to take advantage of the relative low cost that is attributed with those types of LEDs. The converted light emitted from the photoluminescent structure 52 may correspond to a visible light, which includes the portion of the electromagnetic spectrum that can be detected by the human eye (~390-700 nanometers in wavelength) and may be expressed in a variety of colors defined by a single wavelength (e.g. red, green, blue) or a mixture of multiple wavelengths (e.g. white). Thus, it should be understood that the photoluminescent structure 52 may be configured such that converted light emitted therefrom is expressed as unicolored or multicolored light. For instance, the photoluminescent structure 52 may be configured to convert light emitted from light source 62 into white light, which may provide a cost effective alternative to using white LEDs.

According to one embodiment, the photoluminescent structure 52 is substantially Lambertian, that is, the apparent brightness of the photoluminescent structure 52 is substantially constant regardless of an observer's angle of view. As a consequence, converted light may be emitted outwardly from the photoluminescent structure 52 in numerous directions. With respect to the embodiment shown in FIG. 3, a portion of the converted light may be transmitted through the metallic layer 46 and outputted from the portions of the housing 38 via the front, top, and bottom portions 34, 40, 42 of the housing 38, thereby causing those portions to exhibit luminescence. Another portion of the converted light may be emitted into the first compartment 58 and may eventually be redirected back toward the photoluminescent structure 52 by either the reflecting layer 54 or the white solder mask of the first side 66 of the PCB 56 before finally being outputted from a corresponding portion of the housing 38 via the photoluminescent structure 52 and the metallic layer 46. This helps ensure that an optimal amount of converted light is outputted from the housing 38. Furthermore, the provision of the reflecting layer 54 and the white solder mask on the first side 66 of the PCB 56 also helps to ensure that an optimal amount of light emitted from light source 62 reaches the photoluminescent structure 52. For example, it is possible for a portion of the light emitted from light source 62 to reflect off the photoluminescent structure 52, thereby resulting in decreased excitation of the photoluminescent structure 52. Thus, by providing a means to redirect this light back toward the photoluminescent structure 52, wayward propagating light originating from light source 62 and contained within the first compartment 58 is given another opportunity to excite the photoluminescent structure 52. Similarly, the reflecting layer 54 and the white solder mask on the second side 68 of the PCB 56 provide a means to redirect wayward propagating light originating from light source 64 back toward the rear portion 44 to be outputted therethrough, thereby increasing the illumination of the area behind the grille assembly 24. According to one embodiment, light source 64 is an LED configured to emit red light.

Accordingly a luminescent grille bar assembly has been advantageously described herein. The grille bar assembly provides various benefits including an efficient and cost-effective means to produce a variety of illumination to provide a distinct styling element on a vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A grille bar of a vehicle grille assembly, comprising:
   a housing; and
   a first and a second light source disposed inside the housing;
   wherein a first portion of the housing is configured to luminesce in response to excitation by light emitted from the first light source; and
   wherein a second portion of the housing is configured to transmit light emitted from the second light source.

2. The grille bar of claim 1, further comprising a printed circuit board disposed inside the housing and having a first side and a second side, wherein the first light source is disposed on the first side of the printed circuit board and the second light source is disposed on the second side of the printed circuit board.

3. The grille bar of claim 2, wherein the first side and the second side of the printed circuit board are configured to reflect light.

4. The grille bar of claim 2, wherein the printed circuit board partitions the housing into a first compartment and a second compartment, and wherein the first light source is located in the first compartment and the second light source is located in the second compartment.

5. The grille bar of claim 1, wherein the first portion luminesces in a first color and light outputted from the second portion is a second color that is visually distinct from the first color.

6. The grille bar of claim 1, wherein a portion of the housing is metalized to have an outward metallic appearance.

7. A vehicle grille assembly comprising:
   a plurality of grille bars, each including a housing having a first portion and a second portion;
   wherein the first portion of each grille bar illuminates in a first color; and
   wherein the second portion of at least one grille bar illuminates in a second color that is visually distinct from the first color.

8. The vehicle grille assembly of claim 7, further comprising a first light source disposed inside the housing of each grille bar, wherein the first portion is configured to luminesce in response to excitation provided by light emitted from the first light source.

9. The vehicle grille assembly of claim 8, further comprising a second light source disposed inside the housing of at least one grille bar, wherein light emitted from the second light source is outputted from the housing via the second portion.

10. The grille bar of claim 9, further comprising a printed circuit board disposed inside the housing and having a first side and a second side, wherein the first light source is disposed on the first side of the printed circuit board and the second light source is disposed on the second side of the printed circuit board.

11. The grille bar of claim 10, wherein the first side and the second side of the printed circuit board are configured to reflect light.

12. The grille bar of claim 10, wherein the printed circuit board partitions the housing into a first compartment and a second compartment, and wherein the first light source is located in the first compartment and the second light source is located in the second compartment.

13. The grille bar of claim 7, wherein a portion of the housing is metalized to have a metallic outward appearance.

14. A grille bar of a vehicle grille assembly, comprising:
    a housing having a first portion and a second portion;
    a photoluminescent structure coupled to the first portion of the housing;
    a first light source disposed inside the housing and configured to direct light toward the first portion; and
    a second light source disposed inside the housing;
    wherein the photoluminescent structure is configured to luminesce upon being excited by light emitted from the first light source; and
    wherein light emitted from the second light source is outputted from the housing via the second portion.

15. The grille bar of claim 14, further comprising a printed circuit board disposed inside the housing and having a first side and a second side, wherein the first light source is disposed on the first side of the printed circuit board and the second light source is disposed on the second side of the printed circuit board.

16. The grille bar of claim 15, wherein the first side and the second side of the printed circuit board are configured to reflect light.

17. The grille bar of claim 15, wherein the printed circuit board partitions the housing into a first compartment and a second compartment, and wherein the first light source is located in the first compartment and the second light source is located in the second compartment.

18. The grille bar of claim 14, wherein the photoluminescent structure luminesces in a first color and light outputted from the second portion is a second color that is visually distinct from the first color.

19. The grille bar of claim 14, wherein a portion of the housing is metalized to have an outward metallic appearance.

* * * * *